United States Patent [19]

Abdo et al.

[11] Patent Number: 5,084,159

[45] Date of Patent: Jan. 28, 1992

[54] PROCESS AND CATALYST FOR THE DEWAXING OF SHALE OIL

[75] Inventors: Suheil Abdo; Eric L. Moorehead, both of Diamond Bar; John W. Ward, Yorba Linda, all of Calif.

[73] Assignee: Union Oil Company of California, Los Angeles, Calif.

[21] Appl. No.: 371,335

[22] Filed: Jun. 26, 1989

Related U.S. Application Data

[60] Division of Ser. No. 223,664, Jul. 21, 1988, Pat. No. 4,867,861, which is a continuation of Ser. No. 746,186, Jun. 18, 1985, abandoned.

[51] Int. Cl.$^5$ .................. C10G 47/16; C10G 65/12
[52] U.S. Cl. .................. 208/109; 208/111; 208/110; 208/27; 208/28; 208/46
[58] Field of Search ............ 208/27, 28, 30, 111 MC, 208/111

[56] References Cited

U.S. PATENT DOCUMENTS

| | | | |
|---|---|---|---|
| 3,267,022 | 8/1966 | Hansford | 208/111 MC |
| 3,308,069 | 3/1967 | Wadlinger et al. | 502/62 |
| 3,400,072 | 9/1968 | Tung et al. | 208/120 |
| 3,547,808 | 12/1970 | Hansford | 208/111 MC |
| 3,619,407 | 11/1971 | Hendricks | 208/111 MC |
| 3,658,689 | 4/1972 | Steinmetz et al. | 208/28 |
| 3,755,145 | 8/1973 | Orkin | 208/111 MC |
| 3,758,402 | 9/1973 | Oleck et al. | 208/111 |
| 3,758,403 | 9/1973 | Rosinski et al. | 208/75 |
| 3,764,520 | 10/1973 | Kimberlin, Jr. et al. | 208/111 |
| 3,836,454 | 9/1974 | Hansford | 208/111 MC |
| 4,001,106 | 1/1977 | Plank et al. | 208/75 |
| 4,035,285 | 7/1977 | Owen et al. | 208/120 |
| 4,061,724 | 12/1977 | Grose et al. | 502/60 |
| 4,208,305 | 6/1980 | Kouwenhoven et al. | 502/61 |
| 4,270,017 | 5/1981 | Young | 585/437 |
| 4,287,048 | 9/1981 | Gladrow et al. | 208/120 |
| 4,310,440 | 1/1982 | Wilson et al. | 502/208 |
| 4,327,236 | 4/1982 | Klotz | 208/137 |
| 4,340,465 | 7/1982 | Miller et al. | 208/120 |
| 4,377,468 | 3/1983 | La Pierre et al. | 208/111 |
| 4,400,571 | 8/1983 | Robinson | 208/111 MC |
| 4,401,555 | 8/1983 | Miller | 208/120 |
| 4,405,502 | 9/1983 | Klotz | 502/73 |
| 4,419,218 | 12/1983 | Angevine et al. | 208/89 |
| 4,419,271 | 12/1983 | Ward | 208/111 MC |
| 4,421,634 | 12/1983 | Olavesen | 208/111 |
| 4,428,819 | 1/1984 | Shu et al. | 208/46 |
| 4,428,825 | 1/1984 | Ward et al. | 208/109 |
| 4,428,862 | 1/1984 | Ward et al. | 208/111 |
| 4,430,200 | 2/1984 | Shihabi | 208/120 |
| 4,434,047 | 2/1984 | Hensley, Jr. et al. | 208/110 |
| 4,440,871 | 4/1984 | Lok et al. | 208/114 |
| 4,441,991 | 4/1984 | Dwyer et al. | 208/28 |
| 4,468,475 | 8/1984 | Kuehl | 502/85 |
| 4,473,663 | 9/1984 | Patton et al. | 502/208 |
| 4,486,296 | 12/1984 | Oleck et al. | 208/111 |
| 4,501,926 | 2/1985 | LaPierre et al. | 208/111 |
| 4,503,023 | 3/1985 | Breck et al. | 502/60 |
| 4,512,875 | 4/1985 | Long et al. | 208/114 |
| 4,513,091 | 4/1985 | Chang et al. | 502/77 |
| 4,517,074 | 5/1985 | Ward | 208/111 MC |
| 4,563,266 | 1/1986 | Hopkins et al. | 208/110 |
| 4,575,416 | 3/1986 | Chester et al. | 208/111 |
| 4,599,162 | 7/1986 | Yen | 208/59 |
| 4,601,993 | 7/1986 | Chu et al. | 502/66 |
| 4,605,637 | 8/1986 | Chang et al. | 502/77 |
| 4,648,958 | 3/1987 | Ward | 208/111 |
| 4,743,354 | 5/1988 | Ward | 208/111 |
| 4,757,041 | 7/1988 | Oleck et al. | 502/65 |
| 4,767,522 | 8/1988 | Yen | 208/111 |
| 4,867,861 | 9/1989 | Abdo et al. | 208/27 |

*Primary Examiner*—Helane E. Myers
*Attorney, Agent, or Firm*—Yale S. Finkle; Gregory F. Wirzbicki

[57] ABSTRACT

The pour point and/or cloud point of the lube fractions comprising a waxy hydrocarbon feedstock containing straight and branched chain paraffins is reduced by contacting the feedstock in a dewaxing zone, preferably in the presence of added hydrogen, with a dewaxing catalyst comprising (1) an intermediate pore crystalline molecular sieve having a pore size between about 5.0 Angstroms and about 7.0 Angstroms and (2) a large pore crystalline molecular sieve having a pore size above about 7.0 Angstroms and typically selected from the group consisting of silicoaluminophosphates, ferrosilicates, aluminophosphates and Y zeolites. A hydrocarbon fraction of reduced paraffin content is recovered from the effluent of the dewaxing zone. Preferred intermediate pore crystalline molecular sieves are silicalite and a ZSM-5 type zeolite. Preferred large pore crystalline molecular sieves are silicoaluminophosphates such as SAPO-5 and ammonium exchanged and steamed Y zeolites.

30 Claims, No Drawings

PROCESS AND CATALYST FOR THE DEWAXING OF SHALE OIL

CROSS REFERENCES TO RELATED APPLICATIONS

This application is a division of U.S. patent application Ser. No. 223,664, filed in the U.S. Patent and Trademark Office on July 21, 1988 now U.S. Pat. No. 4,867,871, which is a continuation of U.S. patent application Ser. No. 746,186, filed in the U.S. Patent and Trademark Office on June 18, 1985 now abandoned.

BACKGROUND OF THE INVENTION

This invention relates to a catalyst and a process for using such a catalyst to dewax a waxy hydrocarbon feedstock containing straight and branched chain paraffins. The invention is particularly concerned with a process for producing a hydrocarbon product having a relatively low pour point and/or cloud point from a full boiling range shale oil.

Many liquid hydrocarbon feedstocks contain relatively high concentrations of straight and branched chain aliphatic compounds having between 6 and 40 carbon atoms. Some of these long chain compounds, typically the ones containing 12 or more carbon atoms, tend to crystallize upon cooling of the hydrocarbon oil. This crystallization may only take place to the extent that a clear and bright oil becomes dull because of the formation of small crystals, or it may proceed until sufficient crystals are present that they interfere with the flow of the hydrocarbon liquid from one location to another. The temperature at which the waxy substances begin to crystallize from the solution and impart a cloudy appearance is referred to as the "cloud point" and is determined by standardized test procedures. Similarly, the temperature at which sufficient crystals form to prevent the hydrocarbon oil from flowing is commonly referred to as the "pour point" and is also determined by standardized test procedures. An example of a feedstock having a relatively high pour point is the raw oil obtained by retorting oil shale, such as the oil shale found in the Colorado River formation in the Western United States.

Oil shale is a mixture of a minor amount of solid organic matter known as kerogen and a major amount of mineral matter. One method of recovering hydrocarbons from oil shale is by subjecting the shale to heat via pyrolysis or retorting at temperatures between about 850° F. and about 1,000° F. These high temperatures cause the kerogen to decompose into liquid and light gaseous hydrocarbonaceous products. The liquids recovered by condensing the oil shale vapors will normally contain a relatively high concentration of straight and branched chain paraffins of high molecular weight. This high concentration of waxy components typically results in the oil having a relatively high pour point, normally between about 50° F. and about 90° F. In addition, the raw shale oil will contain arsenic, organonitrogen constituents and/or organosulfur constituents.

Raw shale oil is normally upgraded by contacting the oil with a hydrotreating catalyst under conditions such that the concentration of organosulfur and organonitrogen constituents is reduced. The hydrotreated shale oil may then be dewaxed by contacting the oil with a dewaxing catalyst under dewaxing conditions to remove straight and slightly branched chain paraffins and thereby reduce the pour point. In some cases it may be desirable to use the portion of the dewaxed product which boils above about 600° F. as lube oil base stock. This portion of the dewaxed shale oil can be thought of as comprising six lube oil base stock fractions which boil in the following ranges: 610° F. to 650° F., 650° F. to 690° F., 690° F. to 790° F., 790° F. to 830° F., 830° F. to 875° F. and above 875° F. In order for the portion of dewaxed shale oil boiling above 600° F. to be suitable as lube oil base stock, each of the boiling fractions described above must meet minimum pour point requirements. Normally, the pour point must be 10° F. or lower for each of the fractions. Unfortunately, the pour point of a fraction increases as the boiling range of the fraction increases. In conventional dewaxing processes that utilize catalysts which contain an intermediate pore molecular sieve, it is very difficult to meet the pour point requirements for the fractions boiling between 790° F. and 830° F., between 830° F. and 875° F. and above 875° F. In order to meet the minimum pour point requirements of these higher boiling fractions, the dewaxing temperature must either be increased, the space velocity through the dewaxing zone decreased, or a more active catalyst used. Although the use of any one of these three techniques will decrease the pour point of the higher boiling fractions, such use will also result in more conversion of the branched and straight chain paraffins in the lower boiling fractions than is necessary to meet the pour point requirements of these fractions. This additional conversion of branched and straight chain paraffins in the lower boiling fractions represents significant losses in yield of lube oil base stock.

Accordingly, it is one of the objects of the present invention to provide a process for dewaxing shale oil and other waxy hydrocarbon feedstocks such that the various boiling fractions comprising the lube oil base stock portion of the dewaxed oil meet minimum pour point requirements. It is another object of the invention to provide a dewaxing catalyst which can be used to dewax shale oil and other waxy hydrocarbon feedstocks under conditions such that the pour point requirements of all the boiling fractions comprising the lube oil base stock portion of the dewaxed oil are met without incurring excessive losses of lube oil base stock. It is yet another object of the invention to provide a catalyst and process which will remove both straight and branched chain paraffins from waxy hydrocarbon feedstocks. These and other objects of the invention will become more apparent in light of the following description of the invention.

SUMMARY OF THE INVENTION

In accordance with the invention, it has now been found that both straight and branched chain paraffins can be removed from waxy hydrocarbon feedstocks, which normally have not been previously subjected to catalytic dewaxing, without significant losses in lube oil base stock constituents by contacting the feedstock in a dewaxing zone, usually in the presence of hydrogen, with (1) an intermediate pore crystalline molecular sieve having cracking activity and a pore size between about 5.0 Angstroms and about 7.0 Angstroms and (2) a large pore crystalline molecular sieve having cracking activity and a pore size above about 7.0 Angstroms. A hydrocarbon stream of reduced paraffin content is recovered from the effluent of the dewaxing zone. The higher boiling lube oil base stock fractions comprising this stream will have a reduced content of both straight and branched chain paraffins and will have a lower pour point than can be obtained by removing only straight chain paraffins from these fractions. The intermediate pore and large pore crystalline molecular sieves can be combined together to form particles of a dewaxing catalyst or they may be present in the dewaxing zone as a mixture of discrete particles. Also, the process can be carried out by passing the waxy hydrocarbon feedstock in series through two dewaxing zones with one zone containing the intermediate pore crystalline molecular sieve and the other zone containing the large pore crystalline molecular sieve. In a preferred embodiment of the invention, the waxy hydrocarbon feedstock is contacted in a single dewaxing zone with a dewaxing catalyst comprising the intermediate pore crystalline molecular sieve and the large pore crystalline molecular sieve. It is believed that, in comparison to the use of an intermediate pore molecular sieve alone, the use of a large pore molecular sieve in combination with an intermediate pore molecular sieve results in greater removal of branched chain paraffins from the higher boiling lube oil base stock fractions of the dewaxed oil, thereby reducing the pour point of these fractions to values lower than can be obtained by removing only straight chain paraffins without causing a loss of yield due to excessive conversion of straight and branched chain paraffins contained in the lower boiling lube oil base stock fractions.

The catalyst of the invention will preferably contain one or more hydrogenation metal components in addition to the intermediate pore crystalline molecular sieve and the large pore crystalline molecular sieve. Normally, the hydrogenation component or components will contain a metal from Group VIII and/or Group VIB of the Periodic Table of Elements. Preferred large pore molecular sieves are Y zeolites and silicoaluminophosphates such as SAPO-5. The Y zeolite can be any acidic form of Y zeolite whether or not the zeolite has been subjected to dealumination. In some cases it may be preferable to have both a silicoaluminophosphate and a Y zeolite present in the catalyst. Preferred intermediate pore crystalline molecular sieves are silicalite and ZSM-5.

DETAILED DESCRIPTION OF THE INVENTION

Feedstocks that can be used in the process of the invention include waxy raffinates or waxy distillates boiling above about 80° F., usually in the range from about 200° F. to about 1050° F. Such feedbacks, which often have pour points between about 70° F. and 90° F., may be treated in the process of the invention to produce lube oil base stocks of lower pour point, typically below about 10° F. The feedstock will generally contain at least one compound comprising molecules whose longest branch has no more than 5 carbon atoms and at least one compound comprising molecules whose longest branch has at least 6 carbon atoms, preferably more than 10 carbon atoms. As used herein the term "branch" refers to the carbon atoms from and not including a tertiary carbon of a molecule to and including the carbon atom of a terminal methyl group of the molecule.

The preferred feedstock for use in the process of the invention is a full range shale oil or shale oil fraction that has been deashed, dearsenated and catalytically hydrotreated to reduce organonitrogen and organosulfur contaminant levels. One method by which the dearsenation may be carried out is described in U.S. Pat. No. 4,046,674, the disclosure of which is hereby incorporated by reference in its entirety. The hydrotreating step is usually carried out by contacting the deashed and dearsenated shale oil with hydrogen in the presence of a hydrotreating catalyst, which will normally comprise Group VIB and Group VIII metal components on a porous refractory oxide support, under conventional hydrotreating conditions in order to remove organosulfur and organonitrogen compounds by converting them to hydrogen sulfide and ammonia, respectively. Then shale oil derived by retorting oil shale found in the Colorado River formation and adjacent areas is subjected to deashing, dearsenating and hydrotreating in sequence, the shale oil produced will normally have a boiling point range between about 80° F. and about 1,030° F., an organonitrogen content between about 200 wppm and about 3,500 wppm, usually between about 300 wppm and about 2,000 wppm, an organosulfur content between about 30 wppm and 2,000 wppm, normally between about 35 wppm and about 100 wppm, and a pour point above about 70° F., usually between about 75° F. and 90° F.

Typically, the hydrotreating step will be carried out at normal hydrogenation conditions in a conventional hydrotreating reactor in which the liquid feed is passed downwardly through a packed bed of conventional hydrotreating catalyst. Such catalysts normally comprise an alumina or a silica-alumina support carrying one or more Group VIII metals and one or more metals from Group VIB of the Periodic Table of Elements in the form of an oxide or sulfide. Combinations of one or more Group VIB metal oxides or sulfides with one or more Group VIII metal oxides or sulfides are generally preferred. Normally, the preferred metal constituents are either tungsten or molybdenum in combination with either nickel or cobalt.

In accordance with the process of the invention, the effluent from the hydrotreating reactor is passed to a dewaxing reactor where it is directed downwardly through a bed of the catalyst of the invention, normally in the presence of hydrogen, at elevated temperature and pressure Generally, the temperature in the dewaxing reactor will range between about 400° F. and about 850° F., preferably between about 650° F. and about 800° F. The pressure in the reactor will typically be between about 100 p.s.i.g. and about 3,000 p.s.i.g., preferably between about 1,000 p.s.i.g. and about 2,500 p.s.i.g. The rate at which the feedstock is passed through the reactor in contact with the catalyst particles is normally set at a liquid hourly space velocity between about 0.1 and about 10, preferably between about 0.5 and about 2.0. The hydrogen flow rate through the reactor is typically between about 2,000 and about 20,000 standard cubic feet per barrel of feedstock, preferably between about 4,000 and about 15,000 standard cubic feet per barrel.

The catalyst of the invention used in the dewaxing reactor comprises a mixture of (1) an intermediate pore crystalline molecular sieve having cracking activity and a pore size between about 5.0 Angstroms and about 7.0 Angstroms and (2) a large pore crystalline molecular sieve having cracking activity and a pore size above about 7.0 Angstroms. The intermediate pore and large pore molecular sieves may be physically mixed together as discrete particles or combined together in individual particles by a binder comprised of a porous, inorganic refractory oxide. The term "molecular sieve" as used herein refers to any material capable of separating atoms or molecules based on their respective dimensions. Molecular sieves include zeolites, microporous carbons, porous membranes, aluminas and the like. The term "pore size" as used herein refers to the diameter of the largest molecule that can be sorbed by the particular molecular sieve in question. The measurement of such diameters and pore sizes is discussed more fully in Chapter 8 of the book entitled "Zeolite Molecular Sieves" written by D. W. Breck and published by John Wiley & Sons in 1974, the disclosure of which book is hereby incorporated by reference in its entirety. The catalyst of the invention when used under the dewaxing conditions described above is effective for reducing both the straight and branched chain paraffin content of the material fed to the dewaxing reactor. This normally results in a reduction of the pour point and/or cloud point of the various boiling lube oil base stock fractions after they have passed through the dewaxing reactor.

The large pore crystalline molecular sieve which forms one of the components of the catalyst of the invention may be zeolitic or nonzeolitic, has a pore size above about 7.0 Angstroms, possesses cracking activity and is normally comprised of 12-membered rings of oxygen atoms. The term "nonzeolitic" as used herein refers to molecular sieves whose frameworks are not formed of substantially only silica and alumina tetrahedra. The term "zeolitic" as used herein refers to molecular sieves whose frameworks are formed of substantially only silica and alumina tetrahedra such as the framework present in ZSM-5 type zeolites, Y zeolites, and X zeolites. In general, the large pore molecular sieve will nonselectively sorb n-hexane, 2,2-dimethylbutane and larger molecules. Examples of nonzeolitic crystalline molecular sieves which may be used as the large pore component of the catalyst include silicoaluminophosphates, aluminophosphates, and ferrosilicates. Examples of zeolitic crystalline molecular sieves which can be used as the large pore component of the catalyst include Y zeolites, fluorided Y zeolites, X zeolites, zeolite beta, zeolite L and zeolite omega.

The silicoaluminophosphates which may be used as the large pore crystalline molecular sieve in the catalyst of the invention are nonzeolitic molecular sieves comprising a molecular framework of $[AlO_2]$, $[PO_2]$ and $[SiO_2]$ tetrahedral units. The different species of silicoaluminophosphate molecular sieves are referred to by the acronym SAPO-n, where "n" denotes a specific structure type as identified by X-ray powder diffraction. The various species of silicoaluminophosphates are described in detail in U.S. Pat. No. 4,440,871, the disclosure of which is hereby incorporated by reference in its entirety. The silicoaluminophosphates have varying pore sizes and only those that have pore sizes above 7.0 Angstroms may be used as the large pore molecular sieve in the catalyst of the invention. Thus, the silicoaluminophosphates generally suitable for use in the catalyst are SAPO-5, SAPO-31, SAPO-37 and SAPO-40. SAPO-5 is the most preferred silicoaluminophosphate. The silicoaluminophosphates are also discussed in the article entitled "Silicoaluminophosphate Molecular Sieves: Another New Class of Microporous Crystalline Inorganic Solids" published in the *Journal of American Chemical Society*, Vol 106, pp. 6093–6095, 1984. This article is hereby incorporated by reference in its entirety.

Another class of nonzeolitic molecular sieves which can be used as the large pore crystalline molecular sieve in the catalyst of the invention is generally referred to as crystalline aluminophosphates. These molecular sieves have a framework structure whose chemical composition expressed in terms of mole ratios of oxides is $Al_2O_3$: $1.0\pm0.2$ $P_2O_5$. The various species of aluminophosphates are designated by the acronym $AlPO_4$-n, where "n" denotes a specific structure type as identified by X-ray powder diffraction. The structure and preparation of the various species of aluminophosphates are discussed in U.S. Pat. Nos. 4,310,440 and 4,473,663, the disclosures of which are hereby incorporated by reference in their entirety.

Yet another class of nonzeolitic molecular sieves suitable for use as the large pore crystalline molecular sieve in the catalyst of the invention is known as ferrosilicates. These molecular sieves are composed of iron, silicon and oxygen and have three-dimensional crystalline structures comprised of $[SiO_2]$ and $[FeO_2]$ tetrahedra. A ferrosilicate denominated as FeSO-38 is disclosed in European Patent Application No. 83110068.0 filed on Oct. 12, 1982 and published on May 16, 1984 as Publication No. 0 108 271 A2, the disclosure of which application is hereby incorporated by reference in its entirety. FeSO-38 has a structure similar to mordenite, a pore size of about 7.2 Angstroms and is characterized by the X-ray powder diffraction pattern set forth in Table 1 below.

TABLE 1

| d(Angstroms) | Relative Intensity |
|---|---|
| 13.8–13.3 | medium–very strong |
| 9.12–8.98 | strong–very strong |
| 6.61–6.51 | medium–strong |
| 4.00–3.98 | medium–strong |
| 3.49–3.45 | strong–very strong |
| 3.23–3.20 | medium–strong |

FeSO-38 is the preferred ferrosilicate for use as the large pore crystalline molecular sieve.

In addition to the above-discussed nonzeolitic molecular sieves, zeolitic molecular sieves may be used as the large pore crystalline molecular sieve component of the catalyst of the invention. The most preferred zeolitic molecular sieves are crystalline aluminosilicate Y zeolites. U.S. Pat. No. 3,130,007, the disclosure of which is hereby incorporated by reference in its entirety, describes Y-type zeolites having an overall silica-to-alumina mole ratio between about 3.0 and about 6.0, with a typical Y zeolite having an overall silica-to-alumina mole ratio of about 5.0. It is also known that Y-type zeolites can be produced, normally by dealumination, having an overall silica-to-alumina mole ratio above 6.0. Thus, for purposes of this invention, a Y zeolite is one having the characteristic crystal structure of a Y zeolite, as indicated by the essential X-ray powder diffraction pattern of Y zeolite, and an overall silica-to-alumina mole ratio above 3.0, and includes Y-type zeolites having an overall silica-to-alumina mole ratio above about 6.0. Both nondealuminated and dealuminated Y zeolites may be used as the large pore crystalline molecular sieve in the catalyst of the invention. The term "dealuminated Y zeolite" as used herein refers to a Y zeolite which has been treated to remove aluminum from the framework structure of the zeolite. A dealuminated Y zeolite may have an overall silica-to-alumina mole ratio above or below 6.0. It will be understood that in converting a Y zeolite starting material to a dealuminated Y zeolite, the resulting dealuminated zeolite may not have exactly the same X-ray powder diffraction pattern for Y zeolites as is disclosed in U.S. Pat. No. 3,130,007. The d-spacings may be shifted somewhat due to a skrinkage in the unit cell size which is due to a decrease in framework aluminum content. The essential crystal structure of Y zeolite will, however, be retained so that the essential X-ray powder diffraction pattern of the dealuminated zeolite will be consistent with that of either Y zeolite itself or a Y zeolite of reduced unit cell size. Normally, the unit cell size for the dealuminated Y zeolite will be below about 24.65 Angstroms.

The stability and/or acidity of the Y zeolite, whether dealuminated or nondealuminated, used as the large pore molecular sieve may be increased by exchanging the Y zeolite with ammonium ions, polyvalent metal cations, such as rare earth-containing cations, magnesium cations or calcium cations, or a combination of ammonium ions and polyvalent metal cations thereby lowering the sodium content until it is less than about 0.8 weight percent, preferably less than about 0.5 weight percent and most preferably less than about 0.3 weight percent, calculated as $Na_2O$. Methods of carrying out the ion exchange are well known in the art.

Dealuminated Y zeolites for use in the catalyst of the invention may be prepared by any conventional method. There are three general methods for preparing dealuminated Y zeolites. One of these methods, hydrothermal treatment, increases the framework silica-to-alumina mole ratio but not the overall silica-to-alumina mole ratio. The other two methods, chemical treatment and a combination of hydrothermal and chemical treatment, increase both the overall and framework silica-to-alumina mole ratio. Hydrothermal dealumination involves calcination of the ammonium, hydrogen or polyvalent cation form of the Y zeolite starting material at relatively high temperatures, typically above about 900° F., in the presence of steam. This treatment results in the expulsion of tetrahedral aluminum from framework into nonframework positions, but normally does not remove the aluminum from the zeolite and therefore does not increase the overall silica-to-alumina mole ratio of the starting Y zeolite.

Chemical dealumination is achieved by reacting the starting Y zeolite with a suitable reagent in an aqueous or nonaqueous solution or by reacting the zeolite with a reagent in the vapor phase at a high temperature. Dealumination in solution is normally accomplished by reacting the zeolite with solutions of acids, salts, or chelating agents. The combination of thermal and chemical dealumination is typically a two-step method used to obtain a higher degree of dealumination. The mechanism during the thermal treatment step is similar to the one described above for thermal dealumination. High temperatures and steam enhance the expulsion of aluminum from the framework. The chemical treatment then involves the solubilization primarily of nonframework aluminum generated during the thermal treatment step. The nonframework aluminum can be in the form of cationic and neutral species, the amount and composition of which depend upon the conditions of the thermal treatment. Some specific methods of thermal and chemical dealumination are described in detail in the article entitled "The Preparation and Characterization of Aluminum Deficient Zeolites" appearing in *Catalytic Materials: Relationship Between Structure and Reactivity*, ACS Symposium Series 248, 1984, the disclosure of which article is hereby incorporated by reference in its entirety.

A preferred dealuminated Y zeolite for use as the large pore molecular sieve is one prepared by first ammonium exchanging a Y zeolite to a sodium content between about 0.6 and 5 weight percent, calculated as $Na_2O$, calcining the ammonium exchanged zeolite in the presence of at least 0.2 p.s.i. water vapor partial pressure at a temperature between 600° F. and 1,650° F. to reduce the unit cell size to a value in the range between 24.40 and 24.64 Angstroms, and then ammonium exchanging the zeolite once again to replace at least 25 percent of the residual sodium ions and obtain a zeolite product of less than 1.0 weight percent sodium, calculated as $Na_2O$. Such a Y zeolite is highly stable and maintains a high activity. The zeolite is described in detail in U.S. Pat. No. 3,929,672, the disclosure of which is hereby incorporated by reference in its entirety.

A group of dealuminated Y zeolites that may be used as the large pore molecular sieve is known as ultrahydrophobic zeolites. These zeolites are modified zeolites having a unit cell size between about 24.20 and about 24.45 Angstroms and a sorptive capacity for water vapor less than about 5 weight percent of the zeolite at 25° C. and a p/p° of 0.10. Such zeolites are the same or similar to the UHP-Y zeolites disclosed in U.S. Pat. No. 4,401,556 and U.K. Patent No. 2,014,970 published on June 29, 1982, the disclosures of which are hereby incorporated by reference in their entireties. According to these references, a UHP-Y zeolite is defined as a zeolite having a silica-to-alumina mole ratio of from 4.5 to 35, the essential X-ray powder diffraction pattern of zeolite Y, an ion exchange capacity of not greater than 0.070, a unit cell dimension from 24.20 to 24.45 Angstroms, a surface area of at least 350 meters$^2$/gram (B-E-T), a sorptive capacity for water vapor less than 5 weight percent at 25° C. and a p/p° of 0.10 and a Residual Butanol Test Value of not more than 0.4 weight percent. The Residual Butanol Test is a measure of the adsorptive selectivity of zeolite adsorbents for relatively nonpolar organic molecules under conditions in which there is active competition between water and less polar molecules for adsorption on the zeolite. The test procedure is described in detail in the above-identified patents. The preferred ultrahydrophobic zeolite will normally have a silica-to-alumina mole ratio between about 4.5 and about 9, the essential X-ray powder diffraction pattern of zeolite Y, an ion-exchange capacity of not greater than 0.070, and a Residual Butanol Test Value of not more than 0.40 weight percent. The most preferred ultrahydrophobic zeolite is known as LZ-10, a zeolitic molecular sieve available from the Linde Division of Union Carbide Corporation LZ-10 zeolite is a modified Y zeolite having a silica-to-alumina mole ratio between about 4 5 and 6.0, a surface area between about 500 and 700 meters$^2$/gram, a unit cell size between about 24.20 and about 24.35 Angstroms, and a sorptive capacity for water vapor less than about 5 percent by weight of the zeolite at 25° C. and p/p° of 0.10.

Another group of dealuminated Y zeolites which may be used as the large pore molecular sieve in the catalyst of the invention is comprised of zeolites normally having an overall silica-to-alumina mole ratio above about 6.0, preferably between about 6.1 and about 15. The zeolites of this group are prepared by dealuminating a Y zeolite having an overall silica-to-alumina mole ratio below about 6.0 and are described in detail in U.S. Pat. No. 4,503,023, the disclosure of which is hereby incorporated by reference in its entirety A preferred member of this group is known as LZ-210, a zeolitic aluminosilicate molecular sieve available from the Linde Division of the Union Carbide Corporation. LZ-210 zeolites and the other zeolites of this group are conveniently prepared from a Y zeolite starting material in overall silica-to-alumina mole ratios between about 6.0 and about 15, although higher ratios are possible. Preferred LZ-210 zeolites have an overall silica-to-alumina mole ratio of about 6.1 to about 13.0. Typically, the unit cell size is at or below 24.65 Angstroms and will normally range between about 24.20 and about 24.65 Angstroms. LZ-210 zeolites having an overall silica-to-alumina mole ratio below 20 generally have a sorptive capacity for water vapor at 25° C. and 4.6 mm mercury water vapor partial pressure of at least 20 weight percent based on the anhydrous weight of the zeolite. Normally, the oxygen sorptive capacity at 100 mm mercury and −183° C. will be at least 25 weight percent.

In general, LZ-210 zeolites may be prepared by dealuminating Y zeolites using an aqueous solution of a fluorosilicate salt, preferably a solution of ammonium hexafluorosilicate. The dealumination is accomplished by placing a Y zeolite, normally an ammonium exchanged Y zeolite, into an aqueous reaction medium such as an aqueous solution of ammonium acetate, and slowly adding an aqueous solution of ammonium fluorosilicate. After allowing the reaction to proceed, a zeolite having an increased overall silica-to-alumina mole ratio is produced. The magnitude of the increase is dependent at least in part on the amount of fluorosilicate solution contacted with the zeolite and on the reaction time allowed. Normally, a reaction time of between about 10 and about 24 hours is sufficient for equilibrium to be achieved. The resulting solid product, which may be separated from the aqueous reaction medium by conventional filtration techniques, is a form of LZ-210 zeolite. In some cases this product may be subjected to a steam calcination by contacting the product with water vapor at a partial pressure of at least 0.2 p.s.i.a. for a period of between about ¼ to about 3 hours at a temperature between about 900° F. and about 1,500° F. in order to provide greater crystalline stability.

The intermediate pore crystalline molecular sieve used as a component of the catalyst of the invention may be zeolitic or nonzeolitic, has a pore size between about 5.0 and about 7.0 Angstroms, possesses cracking activity and is normally comprised of 10-membered rings of oxygen atoms. In general, the intermediate pore molecular sieve will selectively sorb n-hexane over 2,2-dimethylbutane. Examples of zeolitic crystalline molecular sieves that may be used as the intermediate pore molecular sieve include crystalline aluminosilicates of the ZSM-5 type. Examples of nonzeolitic crystalline molecular sieves which may be used as the intermediate pore molecular sieve include aluminophosphates, ferrosilicates, silicoaluminophosphates, titanium aluminosilicates, borosilicates, chromosilicates and crystalline silicas. Of course, to be effective as the intermediate pore molecular sieve, the particular molecular sieve selected for use must have a pore size between about 5.0 and about 7.0 Angstroms. Aluminophosphates, ferrosilicates and silicoaluminophosphates have been previously described in detail herein. Borosilicates are described in U.S. Pat. Nos. 2,254,297, 4,269,813 and 4,327,236, the disclosures of which are hereby incorporated by reference in their entireties. Chromosilicates are described in detail in U.S. Pat. No. 4,405,502, the disclosure of which is also hereby incorporated by reference in its entirety.

A preferred intermediate pore crystalline molecular sieve that may be used as part of the catalyst of the invention is a crystalline silica molecular sieve essentially free of aluminum and other Group IIIA metals Preferably, the Group IIIA metal-free crystalline silica molecular sieve is a silica polymorph. One highly preferred silica polymorph is known as silicalite and may be prepared by methods described in U.S. Pat. No. 4,061,724, the disclosure of which is hereby incorporated by reference in its entirety. The resulting silicalite may be subjected to combustion to remove organic materials and then treated to eliminate traces of alkali metal ions. Silicalite does not share the zeolitic property of substantial ion exchange common to crystalline aluminosilicates and therefore contains essentially no zeolitic metal cations. Unlike the "ZSM family" of zeolites, silicalite is not an aluminosilicate and contains only trace proportions of alumina derived from reagent impurities.

As mentioned above, a crystalline aluminosilicate of the ZSM-5 type may be used as the intermediate pore crystalline molecular sieve. The crystalline aluminosilicate zeolite may be ZSM-5, ZSM-11, ZSM-12, ZSM-23, ZSM-35, ZSM-38 and the like. ZSM-5, ZSM-11, ZSM-12, ZSM-23, ZSM-35, and ZSM-38 are all known zeolites and are more fully described respectively in the following U.S. patents, the disclosures of which are hereby incorporated by reference in their entirety: U.S. Pat. Nos. 3,702,886; 3,709,979; 3,832,449; 4,076,842; 4,016,245 and 4,046,859. These zeolites are known to readily adsorb benzene and normal paraffins such as n-hexane and also certain mono-branched paraffins, such as isopentane, but have difficulty adsorbing di-branched paraffins, such as 2,2-dimethylbutane. These zeolites are also known to have a crystal density of not less than 1.6 grams per cubic centimeter, a silica-to-alumina mole ratio of at least 12, and a constraint index within the range of 1 to 12. The constraint index is defined in U.S. Pat. No. 4,229,282, the disclosure of which is hereby incorporated by reference in its entirety. The foregoing zeolites are preferably utilized in the acid form by replacing at least some of the ion-exchanged metal cations in the zeolite with hydrogen ions. Prior to the ion exchange, however, the zeolite is typically subjected to combustion to remove organic materials. The ion exchange may then be accomplished directly with an acid or indirectly by ion exchange with ammonium ions followed by calcination to convert the ammonium ions to hydrogen ions. In either case, it is preferred that the exchange be such that a substantial proportion of the ion exchange sites of the zeolite utilized in the catalyst support is occupied with hydrogen ions.

The intermediate pore crystalline molecular sieve and the large pore crystalline molecular sieve may be present in the dewaxing reactor as a physical mixture of particles, or, more preferably, combined with a porous, inorganic refractory oxide component which serves as a binder or matrix. To prepare a catalyst in the latter form, the intermediate pore crystalline molecular sieve and the large pore crystalline molecular sieve are combined with a porous, inorganic refractory oxide component, or a precursor thereof, such as alumina, silica, titania, magnesia, zirconia, borilia, silica-alumina, silica-magnesia, silica-titania, other such combinations and the like. Examples of precursors that may be used include peptized alumina, alumina gel, hydrated alumina, silica-alumina hydrogels, and silica sols. Normally, the porous, inorganic refractory oxide component or precursor thereof is mixed or comulled with both the intermediate pore crystalline molecular sieve and large pore crystalline molecular sieve in amounts such that the final dry catalyst mixture will comprise (1) between about 2.5 weight percent and about 80 weight percent intermediate pore crystalline molecular sieve, preferably between about 15 weight percent and about 80 weight percent, (2) between about 10 weight percent and about 70 weight percent large pore crystalline molecular sieve, preferably between about 15 weight percent and about 50 weight percent, and (3) between about 10 weight percent and about 90 weight percent of porous, inorganic refractory oxide, preferably between about 50 weight percent and about 70 weight percent. The comulled mixture is then formed into particulates, usually by extrusion through a die having openings of a cross sectional size and shape desired in the final catalyst particles. For example, the die may have openings therein in the shape of three-leaf clovers so as to produce an extrudate material similar to that shown in FIGS. 8 and 8A of U.S. Pat. No. 4,028,227, the disclosure of which is hereby incorporated by reference in its entirety. Among preferred shapes for the die openings are ones that result in particles having surface-to-volume ratios greater than about 100 reciprocal inches. After extrusion, the catalyst particles are cut into lengths of from 1/16 to ¼ inch. The resulting particles are subjected to a calcination at an elevated temperature, normally between about 600° F. and about 1600° F., to produce catalytic particles of high crushing strength. Normally, the ratio of intermediate pore molecular sieve to large pore molecular sieve in the final dried catalyst will range between about 0.10 and about 10, preferably between about 1.0 and about 5.0.

In some instances, it is desirable that the catalyst contain one or more hydrogenation components which are preferably the metals, oxides and sulfides of the Group VIII and/or Group VIB elements. The most suitable hydrogenation components are selected from the group consisting of the metals, oxides and sulfides of platinum, palladium, cobalt, nickel, tungsten and molybdenum. In some cases it will be desirable that the catalyst contain at least one Group VIII metal component and at least one Group VIB metal component. When this is the case, the preferred combination will normally be a nickel and/or cobalt component with a molybdenum and/or tungsten component. The hydrogenation component may be impregnated into the extruded catalyst particles from a liquid solution containing the desired hydrogenation component in dissolved form. When the hydrogenation component is a noble metal, it is generally desired that the dissolved hydrogenation component be present in the impregnation liquid in proportions sufficient to ensure that the catalyst contains between about 0.05 and about 10 weight percent of the hydrogenation component, preferably between about 0.10 weight percent and about 3.0 weight percent, calculated as the metal. When the hydrogenation component is a non-noble metal, however, it is normally desired that the dissolved hydrogenation component be present in the impregnation liquid in proportions sufficient to ensure that the catalyst contains between about 1.0 and about 40 weight percent of the hydrogenation component, preferably between about 10.0 weight percent and about 30 weight percent, calculated as the oxide.

Alternative methods of introducing the hydrogenation component into the catalyst include mixing an appropriate solid or liquid containing the desired metal with the materials to be extruded through the die or ion exchanging the metal directly into the large pore and/or intermediate pore crystalline molecular sieve (assuming the sieve has ion exchange properties) prior to composition the sieve with the porous inorganic refractory oxide component.

Because of the presence of both the intermediate pore molecular sieve and the large pore molecular sieve in the dewaxing reactor, both straight and branched chain paraffins will be removed from the hydrotreated feedstock that passes through the reactor. It has been found that the removal of branched chain paraffins from the higher boiling lube oil base stock fractions that comprise the portion of a shale oil feedstock which boils above about 600° F. will result in a reduction of the pour point of these higher boiling lube oil base stock fractions below that which can normally be obtained by removing only straight chain paraffins. Moreover, it has been found that this reduction in pour point can be obtained without incurring a significant loss of yield caused by converting more components than necessary into lower boiling constituents. Thus, the effluent from the dewaxing reactor will contain a number of lube oil base stock fractions boiling above about 600° F. that contain reduced concentrations of both straight and branched chain waxy paraffinic hydrocarbons and will have pour points lower than could be obtained if only straight chain paraffins were removed. The low pour point fractions can be recovered from the dewaxing zone effluent by passing the effluent to a fractionating tower where the various lube oil base stock fractions are separated from the lower boiling constituents. These lube oil base stock fractions can then be blended with other lube oil base stocks to provide a lube oil of desired characteristics. The lower boiling materials are recovered and may be used as desired.

In the embodiment of the invention described above, the intermediate pore molecular sieve and the large pore molecular sieve are present in a single dewaxing zone either as a physical mixture or composited with a refractory oxide component. All or a portion of the effluent from a hydrotreating zone is passed through the dewaxing zone. It will be understood that the process of the invention is not limited to this particular flow scheme. For example, in another embodiment of the process of the invention, two separate dewaxing zones may be utilized in series with one zone containing the intermediate pore molecular sieve and the other containing the large pore molecular sieve. In such an embodiment of the invention, the feed material is passed serially through the two separate dewaxing zones with all or a portion of the effluent from one dewaxing zone being passed through the other dewaxing zone.

The nature and objects of the invention are further illustrated by the following example, which is provided for illustrative purposes only and not to limit the invention as defined by the claims. The example demonstrates that a catalyst containing both a intermediate pore crystalline molecular sieve and a large pore crystalline molecular sieve is effective for removing both straight and branched chain paraffins from a hydrocarbon stream, whereas a catalyst containing an intermediate pore molecular sieve and no large pore molecular sieve is selective for removing straight chain paraffins, and a catalyst containing a large pore molecular sieve and no intermediate pore molecular sieve is selective for removing branched chain paraffins.

EXAMPLE

Various catalysts containing different molecular sieves and combinations of molecular sieves are prepared by mulling mixtures of one or more molecular sieves, alumina, peptized alumina and a small amount of Methocel, an extrusion aid. The mixtures are mulled for 30 minutes and then water is added while the mixtures are mulled for another 15 minutes. The mulled mixtures are then extruded through a 1/16 inch diameter circular die, dried and broken into cylindrical particles varying in length up to ¼ inch. Some of the catalysts thus produced are then impregnated and/or exchanged with palladium metal cations by placing the 1/16 inch extrudates in a basket, suspending the basket in deionized water for 15 minutes and then placing the basket in a stirred solution of palladium dichloride and ammonium hydroxide in deionized water. After the extrudates are allowed to sit in the basket at room temperature for 2 hours, they are rinsed with deionized water, air dried at room temperature and then oven dried at 220° F. overnight. The extrudates are then calcined by contacting them with hot air so that the temperature rises slowly to 900° F. where they are then held for 2 hours.

After several catalysts are prepared as described above, they are evaluated for dewaxing activity as follows. About 15 ml. of each catalyst are placed in a laboratory size reactor vessel through which is passed a gas oil feed which is a denitrogenated, desulfurized, unconverted hydrocarbon fraction obtained from a previous hydrocracking operation. The gas oil has an initial boiling point of about 330° F., a final boiling point of about 820° F. and contains about 20 weight percent of C-13 to C-30 n-paraffins. The gas oil is passed through the reactor at a liquid hourly space velocity of 1.0. The temperature in the reactor is maintained at either 525° F. or 600° F. Hydrogen is also passed through the reactor along with the hydrocarbon oil in an amount equal to 8,000 standard cubic feet of hydrogen per barrel of oil. The hydrogen pressure maintained in the reactor is 1,000 p.s.i.g. After 72 hours of run time, a sample of the oil exiting the reactor is analyzed by gas chromotography. The activity of the catalyst with respect to removing straight chain paraffins is measured by the amount of hexadecane, commonly known as cetane, in the feed that is converted to lower molecular weight constituents as calculated by the difference between the amount of hexadecane measured in the feed to the reactor and the amount measured in the effluent from the reactor divided by the amount in the feed. The activity of the catalyst for removing branched chain paraffins is measured by the amount of 2, 6, 10, 14-tetramethyl pentadecane, commonly known as pristane, in the feed that is converted into lower molecular weight constituents as calculated by the difference between the amount of pristane measured in the feed to the reactor and the amount measured in the effluent from the reactor divided by the amount in the feed. The results of these activity tests are set forth below in Table 2.

TABLE 2

ACTIVITY DATA FOR DEWAXING CATALYSTS

| Catalyst Number | Weight % Silicalite | Weight % Large Pore Molecular Sieve | Weight % Alumina | Weight % Palladium | % Cetane[a] Conversion | % Pristane[b] Conversion |
|---|---|---|---|---|---|---|
| 1 | 30 | 0 | 70 | 0 | 100 | 0 |
| 2 | 0 | 30% SAPO-5 | 70 | 0 | less than[c] 1.0 | 30–35[c] |
| 3 | 30 | 0 | 70 | 0.23 | 81 | less than 5.0 |
| 4 | 0 | 30% LZ-210 zeolite (Si/Al = 6.5) | 70 | 0 | 0 | 5–10 |
| 5 | 30 | 20% SAPO-5 | 50 | 0 | 98 | 20–25 |
| 6 | 30 | 20% SAPO-5 | 50 | 0.26 | 97 | 20–30 |
| 7 | 30 | 20% SAPO-5 | 50 | 0.67 | 77 | 50–60 |
| 8 | 30 | 20% SAPO-5 | 50 | 1.11 | 91 | 35–40 |
| 9 | 30 | 30% stabilized Y[d] | 40 | 0 | 94 | less than 5.0 |
| 10 | 30 | 30% stabilized Y[d] | 40 | 0.99 | 99 | 100 |
| 11 | 30 | 30% LZ-210 zeolite (Si/Al = 6.5) | 40 | 0 | 99 | less than 5.0 |

[a]Hexadecane
[b]2, 6, 10, 14-tetramethyl pentadecane
[c]Conversion data for catalyst 2 obtained at a temperature of 525° F. Conversion data for all other catalysts obtained at 600° F.
[d]Ammonium exchanged stabilized Y zeolite of U.S. Pat. No. 3,929,672

It can be seen from Table 2 that catalysts 1 and 3, which contain silicalite, an intermediate pore molecular sieve, and no large pore molecular sieve, are highly active for the removal of straight chain paraffins as indicated by the high cetane conversions but are inactive with respect to the removal of branched chain paraffins as indicated by the very low pristane conversions under the test conditions employed. A comparison of catalyst 3 with catalyst 1 indicates that the presence of palladium tends to decrease the conversion of straight chain paraffins. The conversion data for catalysts 2 and 4, which contain 30 weight percent large pore molecular sieve (either SAPO-5 or LZ-210 zeolite) and no intermediate pore molecular sieve, indicate that these catalysts are not active in removing straight chain paraffins as indicated by the low cetane conversions. Catalyst 2, however, is active in removing branched chain paraffins as indicated by pristane conversions ranging between 30 and 35 percent. Catalyst 4 is not as active as catalyst 2 in removing branched chain paraffins as indicated by pristane conversions ranging between 5 and 10 percent.

Catalyst 5, which contains both silicalite and the large pore molecular sieve SAPO-5, shows good activity for converting cetane, 98 percent conversion, and moderate activity for converting pristane, 20 to 25 percent conversion. Catalysts 6 through 8 contain the same proportions of silicalite and SAPO-5 as catalyst 5 but contain varying levels of palladium. It appears from the conversion data that the presence of palladium increases the pristane conversion and therefore results in the increased removal of branched chain hydrocarbons.

Catalysts 9 through 11 contain a Y zeolite as the large pore molecular sieve component (either a stabilized Y zeolite or LZ-210 zeolite) and silicalite Catalyst 9 and 11 contain no palladium, whereas catalyst 10 contains about 1.0 weight percent palladium. All three catalysts are highly active for the removal of straight chain paraffins as indicated by high cetane conversions. The pristane conversion data for the three catalysts, however, indicate that the catalysts containing no palladium have low activity with respect to removing branched chain paraffins. The catalyst containing the palladium, on the other hand, is highly active with respect to removing branched chain paraffins as indicated by a 100 percent pristane conversion. Catalyst 10, which contains 30 weight percent silicalite, 30 weight percent stabilized Y zeolite, 40 weight percent alumina and about 1.0 weight percent palladium, has the highest overall activity for the conversion of straight and branched chain paraffins as compared to the other eleven catalysts and appears to give near complete conversion of both straight and branched chain paraffins as indicated by a cetane conversion of 99 percent and a pristane conversion of 100 percent.

Although this invention has been primarily described in conjunction with an example and by reference to several embodiments of the invention, including a preferred embodiment, it is evident that many alterations, modifications and variations will be apparent to those skilled in the art in light of the foregoing description. Accordingly, it is intended to embrace within the invention all such alternatives, modifications and variations that fall within the spirit and scope of the appended claims.

We claim:

1. A process for hydrodewaxing a waxy hydrocarbon feedstock containing a hydrocarbon fraction boiling above about 600° F. which is comprised of components boiling between about 600° F. and about 790° F. and components boiling above about 790° F., which process comprises contacting said waxy hydrocarbon feedstock with a hydrodewaxing catalyst in a hydrodewaxing zone in the presence of hydrogen under conditions such that the pour points of said 600°–790° F. boiling components and said 790° F.+ boiling components are substantially reduced, wherein said hydrodewaxing catalyst comprises (1) silicalite, (2) a hydrogenation metal component, (3) a stabilized Y zeolite having cracking activity and a unit cell size between 24.40 and 24.64 angstroms, and (4) an alumina binder, said silicalite and said stabilized Y zeolite being held together by said alumina binder.

2. A process as defined by claim 1 wherein said hydrogenation metal component comprises a metal selected from the group consisting of Group VIB metals and Group VIII metals.

3. A process as defined by claim 2 wherein said hydrogenation metal component comprises palladium.

4. A process as defined by claim 1 wherein said waxy hydrocarbon feedstock comprises shale oil.

5. A process as defined by claim 1 wherein said stabilized Y zeolite is prepared by ammonium exchanging a Y zeolite to a sodium content between about 0.6 and 5 weight percent, calculated as $Na_2O$, calcining the ammonium-exchanged Y zeolite at a temperature between about 600° F. and about 1650° F. in the presence of steam at a water vapor partial pressure of at least about 0.2 p.s.i.a. to reduce the unit cell size of said ammonium-exchanged Y zeolite to a value in the range between about 24.40 and about 24.64 Angstroms and then ammonium exchanging the steam-calcined zeolite to replace at least about 25 percent of the residual sodium ions and obtain a zeolite product containing less than about 1.0 weight percent sodium, calculated as $Na_2O$.

6. A process as defined by claim 5 wherein said hydrogenation metal component comprises palladium.

7. A process as defined by claim 6 wherein said waxy hydrocarbon feedstock comprises shale oil.

8. A process as defined by claim 1 wherein said silicalite and said stabilized Y zeolite are present in said hydrodewaxing catalyst in a weight ratio ranging between about 0.1 and about 10.

9. A process as defined by claim 1 wherein the pour point of said 600°–790° F. boiling components and said 790° F.+ boiling components are reduced by greater than about 60° F.

10. A process as defined by claim 6 wherein said hydrodewaxing catalyst comprises between about 0.1 and about 3.0 weight percent palladium, calculated as the metal.

11. A process for hydrodewaxing a waxy hydrocarbon feedstock containing pristane and hydrocarbons boiling above about 600° F. which process comprises contacting said waxy hydrocarbon feedstock with a hydrodewaxing catalyst in a hydrodewaxing zone in the presence of hydrogen under conditions such that at least about 20 percent of said pristane is converted into lower molecular weight components and the pour point of said hydrocarbons boiling above about 600° F. is substantially reduced, wherein said hydrodewaxing catalyst comprises silicalite, a Y zeolite having cracking activity, a hydrogenation metal component and alumina.

12. A process as defined by claim 11 wherein said hydrogenation metal component comprises a metal selected from the group consisting of Group VIB metals and Group VIII metals.

13. A process as defined by claim 12 wherein said hydrogenation metal component comprises palladium.

14. A process as defined by claim 11 wherein said waxy hydrocarbon feedstock comprises shale oil.

15. A process as defined in claim 11 wherein said Y zeolite is prepared by ammonium exchanging a Y zeolite to a sodium content between about 0.6 and 5 weight percent, calculated as $Na_2O$, calcining the ammonium-exchanged Y zeolite at a temperature in the range between about 600° F. and about 1650° F. in the presence of steam at a water vapor partial pressure of at least about 0.2 p.s.i.a. to reduce the unit cell size of said ammonium-exchanged Y zeolite to a value in the range between about 24.40 and about 24.64 Angstroms and then ammonium exchanging the steam-calcined zeolite to replace at least about 25 percent of the residual sodium ions and obtain a zeolite product containing less than about 1.0 weight percent sodium, calculated as $Na_2O$.

16. A process as defined by claim 15 wherein said hydrogenation metal component comprises palladium.

17. A process as defined by claim 11 wherein said waxy hydrocarbon feedstock contains cetane and at least about 90 percent of said cetane is converted into lower molecular weight components during the contacting of said feedstock with said dewaxing catalyst.

18. A process as defined by claim 11 wherein the pour point of said hydrocarbons boiling above about 600° F. is reduced by greater than about 60° F.

19. A process for hydrodewaxing a waxy hydrocarbon feedstock containing a hydrocarbon fraction boiling about above 600° F., which process comprises contacting said waxy hydrocarbon feedstock with a hydrodewaxing catalyst in a hydrodewaxing zone in the presence of hydrogen under conditions such that the pour point of said hydrocarbon fraction is reduced, wherein said hydrodewaxing catalyst comprises a (1) hydrogenation metal component, (2) silicalite, (3) a dealuminated Y zeolite having cracking activity, an overall silica-to-alumina mole ratio above 6.0, ad a unit cell size between about 24.20 and 24.65 angstroms, and (4) an alumina binder, said silicalite and said dealuminated Y zeolite being held together by said alumina binder.

20. A process as defined by claim 19 wherein said hydrogenation metal component comprises a metal selected from the group consisting of Group VIB metals an Group VIII metals.

21. A process as defined by claim 19 wherein said hydrogenation metal component comprises palladium.

22. A process as defined by claim 19 wherein said waxy hydrocarbon feedstock is shale oil.

23. A process for hydrodewaxing a waxy hydrocarbon feedstock containing a hydrocarbon fraction boiling above about 600° F., which process comprises contacting said hydrocarbon feedstock with a hydrodewaxing catalyst in a hydrodewaxing zone in the presence of hydrogen under conditions such that the pour point of said hydrocarbon fraction is reduced, wherein said hydrodewaxying catalyst comprises (1) a hydrogenation metal component, (2) silicalite, (3) a modified Y zeolite having cracking activity, a unit cell size between about 24.20 and 24.45 angstroms, and a sorptive capacity for water vapor less than about 5 weight percent of said zeolite at 25° C. and a $p/p°$ of 0.10, and (4) an alumina binder, said silicalite and said modified Y zeolite being held together by said alumina binder.

24. A process as defined by claim 23 wherein said modified Y zeolite is LZ-10 zeolite.

25. A process as defined by claim 24 wherein said hydrogenation metal component comprises a metal selected from the group consisting of Group VIB metals and Group VIII metals.

26. A process as defined by claim 25 wherein said hydrogenation metal component comprises palladium.

27. A process as defined by claim 26 wherein said hydrocarbon feedstock is shale oil.

28. A process as defined by claim 19 wherein said dealuminated Y zeolite is prepared by contacting an ammonium-exchanged Y zeolite with an aqueous solution of ammonium hexafluorosilicate.

29. A process as defined by claim 19 wherein said dealuminated Y zeolite is LZ-210 zeolite.

30. A process as defined by claim 21 wherein said dealuminated Y zeolite is LZ-210 zeolite.

* * * * *

UNITED STATES PATENT AND TRADEMARK OFFICE
CERTIFICATE OF CORRECTION

PATENT NO. : 5,084,159
DATED : January 28, 1992
INVENTOR(S) : Abdo et al.

It is certified that error appears in the above-indentified patent and that said Letters Patent is hereby corrected as shown below:

Column 9, line 65, change "2,254,297" to -- 4,254,297 --.

Column 17, claim 20, line 22, change "an" to -- and --.

Signed and Sealed this

Twelfth Day of July, 1994

Attest:

BRUCE LEHMAN

Attesting Officer

Commissioner of Patents and Trademarks